United States Patent [19]

Sorrick

[11] Patent Number: 4,925,560

[45] Date of Patent: May 15, 1990

[54] CLOG RESISTANT HIGH EFFICIENCY FILTER MEDIA

[76] Inventor: Charles H. Sorrick, 397 Winry, Rochester, Mich. 48063

[21] Appl. No.: 305,187

[22] Filed: Feb. 2, 1989

[51] Int. Cl.$^5$ ................... B01D 25/04; B01D 29/08
[52] U.S. Cl. .................................. 210/387; 210/504; 210/505; 210/509; 264/41; 264/41.5
[58] Field of Search ............................... 210/503–506, 210/508, 509, 359, 387; 264/41, 41.5

[56] References Cited

U.S. PATENT DOCUMENTS 4,157,968  6/1979  Kronsbein .......................... 210/489
4,734,208  3/1988  Pall et al. .......................... 210/504

Primary Examiner—Frank Sever
Attorney, Agent, or Firm—Reising, Ethington, Barnard, Perry & Milton

[57] ABSTRACT

A filter media (10) of the type supported across a fluid flow passage for collecting particulate out of the fluid and subsequently being moved out of the flow passage after becoming congested with particulate. The filter media (10) includes a top layer (12), a middle layer (14), and a bottom layer (16). The middle layer (14) comprises a support web (18) formed by entwined cotton fibers (20), and a mesh (22) supported by the web (18) formed by entwined glass microfibers (24). The middle layer (14) forms a plurality of minute pore passages between adjacent glass microfibers (24) and cotton fibers (20). The top layer (12) is a nonwoven wet laid polyester material for preventing adherence of the fiber media (10) to the edges of the fluid flow passage. The bottom layer (16) is a nonwoven spun bonded polyester material highly resistant to tear for supporting the filter media (10) while it is moved out of the flow passage.

20 Claims, 2 Drawing Sheets

CLOG RESISTANT HIGH EFFICIENCY FILTER MEDIA

TECHNICAL FIELD

The subject invention relates to a filter media supported across a fluid flow passage for collecting particulate out of the fluid, and more particularly to a filter media for collecting aluminum particles out of machine coolant used during the manufacture of two-piece aluminum containers.

BACKGROUND ART

During the manufacture of two-piece aluminum containers, e.g., beverage cans, liquid coolant is continuously circulated to cool the forming members and carry off unwanted waste aluminum particles. For economical reasons, the coolant is recirculated through the forming machines for reuse. The recirculated coolant, however, must be filtered to remove the waste aluminum particles. A typical plant manufacturing such aluminum containers may employ twenty forming machines, with a combined coolant requirement of five thousand gallons. It will be readily appreciated that the filtering requirements for five thousand gallons of continuously flowing coolant will be both critical and substantial.

Filter media used to collect aluminum particulate out of a coolant flow have heretofore been either of a high efficiency type or a long life type. The high efficiency type are characterized by collecting a large quantity of particulate out of the coolant flow. This is accomplished by using very small diameter pore openings in the filter media so that very small particulate can be collected out of the coolant flow. The high efficiency type filters, however, are prone to rapid congestion, and hence must be frequently changed. Also, there is a relatively high pressure drop across these prior art high efficiency filters. Therefore, the high efficiency type filters must be frequently changed, thus expensive to use, and do not allow for fast filtration as evidenced by the large pressure drop but provide excellent particulate filtration.

The long life type filters, on the other hand, do not rapidly congest with particulate and are therefore less costly to operate because of the relatively infrequent changing required. This is accomplished by providing larger diameter pore opening in the filter media so that only the larger aluminum particles are collected. The trade-off being, however, that the long life filters can not collect relatively small sized particulate out of the fluid flow due to the relatively large pore openings. Thus, the recirculated coolant is not cleaned as well with the long life type filters when compared with the high efficiency filters, resulting in accelerated wear of the forming machines.

There is a great need in this art for a filter media which both removes very small particulate out of the fluid flow and also possess long life properties to withstand rapid clogging.

U.S. Pat. No. 4,157,968 to Kronsbein, issued June 12, 1979, discloses a tubular filter including a binder-free glass microfiber fleece sandwiched between two layers of a nylon based reinforcing material. The Kronsbein filter media is not self-supporting, but requires two supporting shells made of a stainless steel wire mesh. The steel wire mesh creates an expensive and heavy filter media which would be difficult to properly employ in the manufacture of aluminum containers.

Certain prior art automotive filter media is fabricated from a mixture of cellulose and glass microfibers. This composite material filter media is then supported by a rigid exostructure.

SUMMARY OF THE INVENTION AND ADVANTAGES

The subject invention provides a filter media of the type supported across a fluid flow passage for collecting particulate out of the fluid and subsequently being moved out of the flow passage after becoming congested with particulate. The filter media comprises a sheet-like fluid permeable top layer for collecting particulate larger than a predetermined size out of the fluid, a sheet-like fluid permeable middle layer disposed adjacent the top layer for collecting particulate smaller than the particulate collected by the top layer, and a sheet like fluid permeable bottom layer disposed adjacent the middle layer and opposite the top layer and having a greater resistance to tear than the top and middle layers. The filter media of the subject invention is characterized by the middle layer including a support web formed by entwined cellulose fibers having a first predetermined range of thicknesses, and a mesh supported by the cellulose web formed by entwined glass microfibers having a second predetermined range of thicknesses smaller than the cellulose fiber first range of thicknesses, with the middle layer forming a plurality of relatively minute pore passages between adjacent glass microfibers and cellulose fibers.

The subject invention also provides a method for making a filter media comprising the steps of forming a sheet-like fluid permeable top layer, forming a sheet-like fluid permeable middle layer, forming a sheet-like bottom layer, and fastening the top layer and the middle layer and the bottom layer together in a sheet. The method is characterized by the step of forming the middle layer including mixing a slurry of glass microfibers and cellulose fibers and an evaporatable liquid, depositing the slurry in a thin layer onto a generally planar surface, and then removing the liquid from the glass microfiber and cellulose fiber mixture to form a filter layer having a plurality of relatively minute pore passages between adjacent glass microfibers and cellulose fibers.

The subject invention overcomes much of the disadvantages in the prior art by providing a glass microfiber mesh supported by a cellulose web which is sandwiched between two reinforcing sheets. The composite fiber structure of the middle layer provides a high efficiency filter which does not readily clog or become congested with particulate. Specifically, the cellulose web provides a support structure capable of withstanding the forces placed upon the middle layer, while the mesh of glass microfibers creates a plurality of minute pore passages through which the fluid is passed and in which the particulate is collected. The glass microfibers are much smaller in thickness than the cellulose fibers so that they present a very small area toward the flow of fluid. In this manner, comparatively more pore passages are formed per a unit area than if larger diameter fibers were used to create pore passages of the same size. Therefore, the subject filter is highly efficient due to the very minute pore passages created in the middle layer, and the filter is clog resistant for long life operation due to the many pore passages created between the adjacent glass microfibers and cellulose fibers.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

The subject invention relates broadly to an improved filter media for the filtration of industrial coolant such as is used in the production of two-piece aluminum beverage containers. A three layer filter media according to the subject invention is generally shown at 10 in FIG. 1. In the production of two-piece aluminum beverage containers, filter media 10 is supported across a filter chamber, generally indicated at 26 in FIG. 3, which defines a coolant fluid flow passage. Aluminum particulate is collected out of recirculated coolant in the filter chamber 26. When the filter media 10 becomes congested with particulate, it is moved out of the flow passage in the filter chamber 26 and a fresh new area of filter media 10 is moved into place. This is typically accomplished by a strip indexing method wherein a large drum or spool 28 of the filter media 10 is positioned just outside of the filter chamber 26. Automatic sensing equipment determines when the filter media 10 becomes overly congested with particulate and then automatically indexes a new fresh portion of filter media 10 from the spool 28 into the flow passage in the filter chamber 26. Typically, a pin extractor 30, resembling a spiked chain or belt, is disposed on the opposite side of the filter chamber 26 from the spool 28 and moves at the appropriate time to successively puncture the filter media 10 and pull, or draw, the filter media 10 out of the flow passage in the filter chamber 26 so that a new fresh portion of the filter media 10 is presented inside the filter chamber 26.

Figure 1:
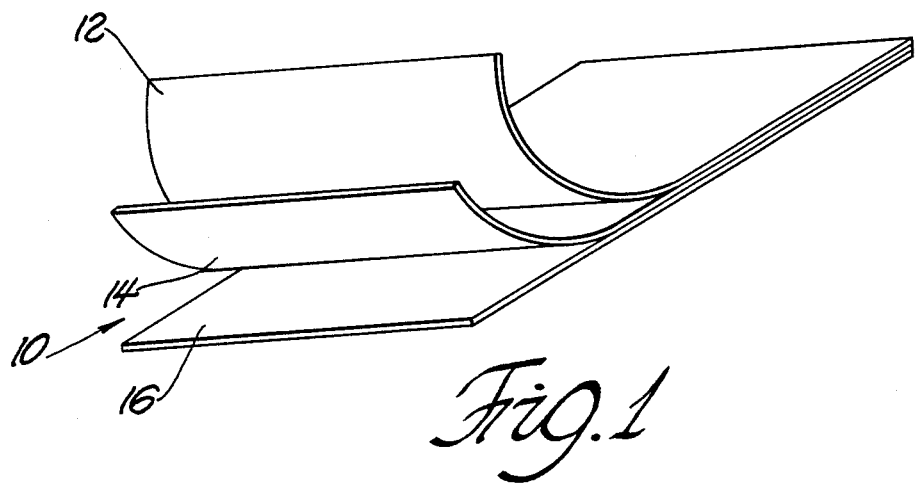
FIG. 1 is a perspective view of a three layer filter according to the subject invention.

The filter media 10, as shown in FIG. 1, includes a sheet-like fluid permeable top layer 12 for collecting particulate larger than a predetermined size out of the coolant. A sheet-like fluid permeable middle layer 14 is disposed adjacent the top layer 12 for collecting particulate smaller than the particulate collected by the top layer 12. A sheet-like fluid permeable bottom layer 16 is disposed adjacent the middle layer 14 and opposite the top layer 12. The bottom layer 16 has a greater resistance to tear than the top layer 12 or the middle layer 14 to facilitate strip indexing when the pin extractor 30 punctures the filter media 10 and rotates to pull a fresh portion of the filter media 10 into the coolant flow passage in the filter chamber 26.

Each of the three filter layers cooperate with each other to provide the novel advantages of the subject filter media 10. For example, the top layer 12 supports, or protects, the middle layer 14 and prevents the filter media 10 from adhering, or sticking, to the edges of the filter chamber 26 as it is indexed into and then out of a filtering position in the coolant flow passage. The bottom layer 16 also supports, or protects, the middle layer 14 and enables the filter media 10 to resist tearing when the pin extractor 30 perforates the filter media 10 urging it to be moved through the filter chamber 26. The middle layer 14 presents the smallest pore passages and thereby functions to collect and remove the smallest particulate out of the coolant flow. The combined effect of each of these layers allow highly efficient particulate removal and long life operation in the filtration of industrial coolant. In other words, the filter media 10 achieves its novel results only by the three layers 12, 14, 16 functioning in concept.

Figure 2:
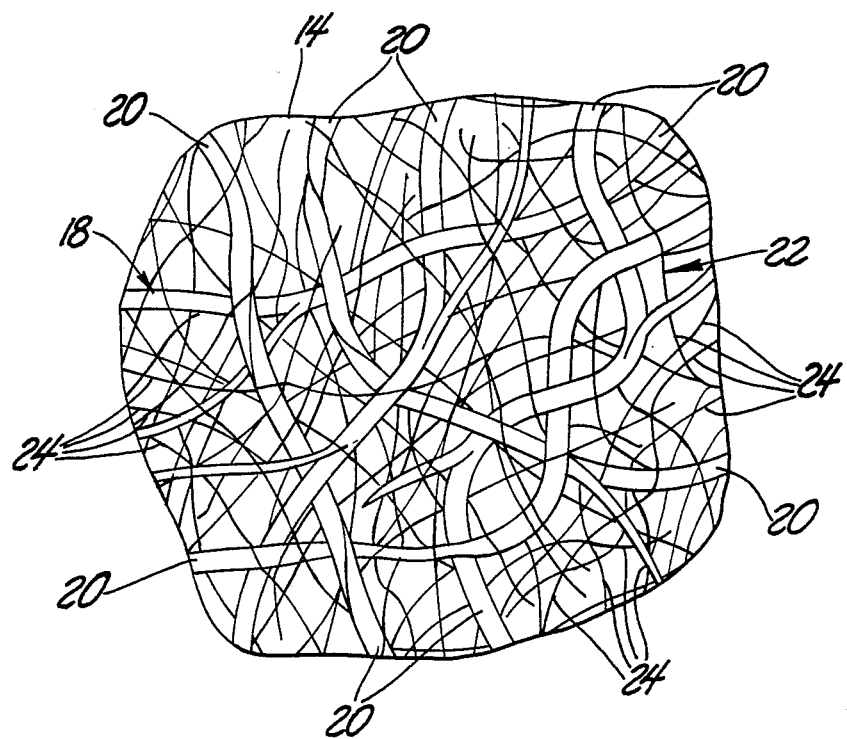
FIG. 2 is an enlarged top view of the middle layer of the subject invention.

Turning to FIG. 2, an enlarged view of the middle layer 14 is shown. The illustration of FIG. 2 is approximately fifty times larger than life size. The filter media 10 is characterized by the middle layer 14 including a support web, generally indicated at 18, formed by entangled cellulose fibers 20 having a first predetermined of thicknesses. That is, the thicknesses, or diameters, of the cellulose fibers 20 fall within a first predetermined range. A mesh, generally indicated at 22, is supported by the cellulose web 18. The mesh 22 is formed by entangled glass microfibers 24 having a second predetermined range of thicknesses smaller than the cellulose fiber 20 first range of thicknesses. In other words, the thickness, or diameter, of the glass microfibers 24 is smaller than, and preferably much smaller than, the cellulose fibers 20. Therefore, cellulose fibers 20 and glass microfibers 24 of the middle layer 14 form a plurality of relatively minute pore passages between adjacent glass microfibers 24 and cellulose fibers 20. The mean size, or area, of the pore passages in the middle layer 14 is smaller than the mean thickness of the cellulose fibers 20.

It has been found that cotton fibers provide superior characteristics when used as the cellulose fibers 20 of the support web 18. Therefore, cotton fibers 20 are entwined together, and entwined with, the glass microfibers 24 to form the middle layer 14. The cotton fibers 20 generally range in thickness from sixteen to twenty microns. The glass microfibers 24 are approximately one half to three microns thick. Preferably, the thickness of the glass microfibers 24 are less than one-fifth the thickness of the cotton fibers 20.

The cellulose cotton fibers 20 and glass microfibers 24 of the middle layer 14 are randomly dispersed throughout the middle layer 14 and bonded together with a binder means to form a cohesive membrane. That is, the binder means is mixed with the fibers in the middle layer to enhance the bond between the individual fibers. A wet strength additive material is included in the binder means to resist degradation of the middle layer 14 when moist. Melamine formaldehyde has been found to be a suitable wet strength additive material.

The glass microfibers 24 generally comprise less than 50 percent by weight of the middle layer 14, and preferably comprise between 30 percent and 35 percent by weight of the middle layer 14. The size of the pore passages in the middle layer 14 are proportionately controlled by the percentage of glass microfibers 24.

The top layer 12 is comprised of nonwoven polyester fibers. Preferably, the polyester fibers of the top layer 12 are formed using a wet laid process. The polyester fibers are first suspended in water to obtain a uniform dispersion. The mixture is then deposited onto a moving screen where the water is removed, leaving the polyester fibers in the form of a web. Additional water is squeezed from the web and the remaining water is removed by drying.

The bottom layer 16 is also formed of polyester fibers, however a spun bonding process is preferred. According to spun bonding techniques, polyester is extruded through a spinneret. After cooling, the filaments are deposited onto a moving conveyor belt to form a continuous web. The desired orientation of the polyester fibers is achieved as they are deposited onto the moving conveyor.

The filter media 10 of the subject invention is fabricated by forming the top layer 12 as described above, forming the middle layer 14 as will be described below, forming the bottom layer 16 as described above, and fastening the top layer 12, the middle layer 14 and the bottom layer 16 together into a sheet. The three layers 12, 14, 16 may be fastened together by any conventional method, such as a chemical adhesive, sonic sealing or heat sealing.

The middle layer 14 is formed by mixing a slurry of glass microfibers 24 and cellulose fibers 20 and the binder means in the proper proportions with an evaporatable liquid, such as water. The slurry is deposited in a layer onto a generally planar surface, such as a moving porous conveyor belt. The majority of the liquid is removed from the fiber mixture while on the conveyor belt so that a filter layer of glass microfibers 24 and cellulose fibers 20 are formed into a sheet having a plurality of minute pore passages between adjacent glass microfibers 24 and cellulose fibers 20.

Figure 3:
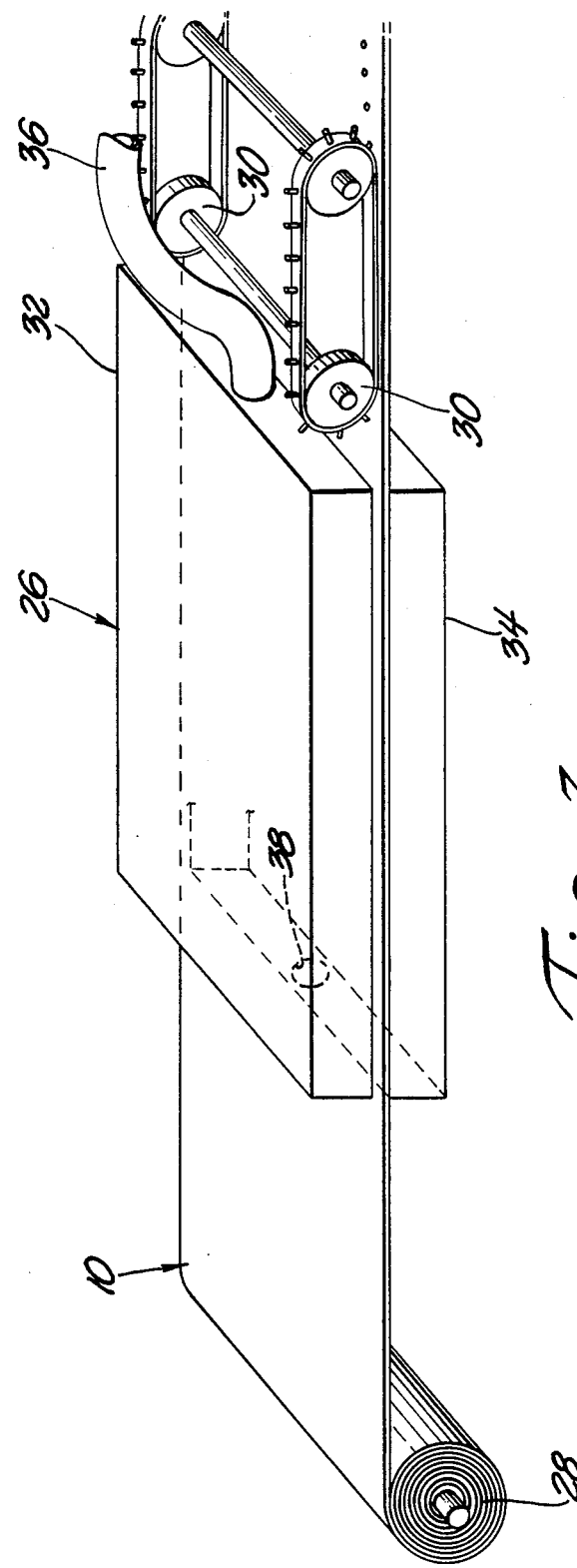
FIG. 3 is a simplified perspective view of a filter media according to the subject invention positioned for operation in the filter chamber of an industrial coolant system.

In FIG. 3 is shown a simplified representation of the environment in which the subject invention 10 is used. As discussed above, the filter media 10 is supported across the filter chamber 26. In actual practice, however, a plurality of identical filter chambers 26 are employed in a vertically stacked orientation, with a spool 28 of filter media associated with each chamber 26. The filter chamber 26 is a hollow box-shaped member having a top half 32 and a bottom half 34. The filter media 10 is clamped between the top 32 and bottom 34 halves during operation. An upstream fluid inlet 36 is provided to the top half 32 and a downstream fluid outlet 38 is provided from the bottom half 34. Coolant entering the filter chamber 26 from the inlet 36 must pass through the filter media 10 before exiting via the outlet 38. Aluminum particulate in the coolant is collected in the filter media 10 as the coolant moves from the top half 32 to the bottom half 34 of the filter chamber 26. The top half 32 of the filter chamber 26 can be pressurized, such as by compressed air, to assist movement of the coolant through the filter media 10.

When the filter media 10 supported across the filter chamber 26 becomes congested with particulate, the top half 32 and bottom half 34 automatically separate, i.e., move apart, to release their clamp on the filter media 10. The pin extractor 30 then rotates to draw a fresh clean portion of filter media 10 into the filter chamber 26 from the spool 28. Once the fresh portion of filter media 10 is in position, the top 32 and bottom 34 halves reclamp upon the filter media 10, perfecting a fluid tight seal about their perimeters.

The subject invention overcomes deficiencies in the prior art filter media for industrial coolant by providing a filter media 10 possessing both high efficiency and long life properties. The filter media 10 accomplishes this by the unique composite structure of the middle layer 14. The glass microfibers 24 have an extremely small diameter relative to the cotton fibers 20, and therefore can be closely spaced to each other to create a plurality of minute pore passages without blocking a substantial amount of the coolant flow through the filter media 10. Because the glass microfibers 24 are so small in relation to the pores formed, more pores are created for a given area thus increasing the longevity of the filter media 10. Also, smaller pores can be formed without increasing pressure drop across the filter 10 thus allowing smaller sized particulate to be removed from the coolant flow.

The cellulose fibers 20 support, or reinforce, the glass microfibers 24. The glass microfibers 24 are not in themselves strong enough to withstand the harsh operating conditions encountered during coolant filtration, and therefore require the reinforcement provided by the cellulose cotton fibers 20. Similarly, the middle layer 14 itself is not strong enough to withstand the industrial filtration procedures discussed above, and therefore requires the top 12 and bottom 16 support layers for their prescribed functions. Absent any on of the three layers 12, 14 or 16, the subject filter media 10 would not properly operate to filter industrial coolant in the preferred environment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A filter media (10) of the type supported across a fluid flow passage for collecting particulate out of the flow passage after becoming congested with particulate, said filter media (10) comprising: means designed for effectively removing aluminum particles from machine coolant including a sheet-like fluid permeable top layer (12) for collecting particulate larger than a predetermined size out of the fluid; a sheet-like fluid permeable middle layer (14) disposed adjacent said top layer (12) for collecting particulate smaller than the particulate collected by said top layer (12); a sheet-like fluid permeable bottom layer (16) disposed adjacent said middle layer (14) and opposite said top layer (12) and having a greater resistance to tear than said top (12) and middle (14) layers; and characterized by said middle layer (14) including a support web (18) formed by entangled cellulose fibers (20) having a first predetermined range of thicknesses, and a mesh (22) supported by and interspersed throughout said cellulose web (20) and being formed by entangled glass microfibers (24) having a second predetermined range of thicknesses smaller than said cellulose fiber (20) first range of thicknesses, said middle layer (14) forming a plurality of relatively minute pore passages between adjacent glass microfibers (24) and cellulose fibers (20).

2. A filter (10) as set forth in claim 1 further characterized by said cellulose fibers (20) of said support web (!8) including cotton fibers (20).

3. A filter (10) as set forth in claim 2 further characterized by said second predetermined range of glass microfiber thickness having a mean value not greater than one-fifth the mean value of said first predetermined range of cellulose fiber thicknesses.

4. A filter (10) as set forth in claim 3 further characterized by said second predetermined range of glass microfiber thickness ranging between one half micron and three microns.

5. A filter (10) as set forth in claim 3 further characterized by said middle layer (14) including binder means for bonding said cotton fibers (20) to said glass microfibers (24).

6. A filter (10) as set forth in claim 5 further characterized by said cotton fibers (20) and said glass microfibers (24) being randomly dispersed throughout said middle layer (14).

7. A filter (10) as set forth in claim 6 further characterized by said glass microfibers (24) comprising less than fifty percent by weight of said middle layer (14).

8. A filter (10) as set forth in either of claim 7 further characterized by said binder means including a wet strength additive material resistant to degradation when moist.

9. A filter (10 as set forth in claim 8 further characterized by said top layer (12) including wet laid polyester fibers.

10. A filter (10) as set forth in claim 9 further characterized by said bottom layer (16) including spun bonded polyester fibers.

11. A filter (10) as set forth in claim 6 further characterized by said glass microfibers (24) comprising between thirty percent and thirty five percent by weight of said middle layer (14).

12. A method for making a filter media (10) comprising providing means designed for effectively removing aluminum particles from machine coolant by forming a sheet-like fluid permeable middle layer (14); forming a sheet-like bottom layer (16); fastening the top layer (12) and the middle layer (14) and the bottom layer (16) together in a sheet; and characterized by the step of forming the middle layer (14) including mixing a slurry of interspersed glass microfibers (24) and cellulose fibers (20) and an evaporatable liquid, depositing the slurry in a layer onto a generally planar surface, and then removing the liquid from the glass microfiber (24) and cellulose fiber (20) mixture to form a middle layer (14) having a plurality of relatively minute pore passages between adjacent glass microfibers (24) and cellulose fibers (20).

13. A method as set forth in claim 12 further including the step of binding together the glass microfibers (24) and cellulose fibers (20).

14. A method as set forth in claim 13 further including the step of forming larger pore openings in the top layer (12) than the minute pore passages in the middle layer (14).

15. A method as set forth in claim 14 further including the step of forming larger pore openings in the bottom layer (16) than in the middle layer (14).

16. A method as set forth in claim 15 further including the step of wet laying polyester fibers to form the top layer (12).

17. A method as set forth in claim 16 further including the step of spin bonding polyester fibers to form the bottom layer (16).

18. A filtration apparatus of the type for collecting aluminum particulate out of a liquid flow, said apparatus comprising: a filter chamber (26) having a top half (32) and a bottom half (34); a fluid inlet (36) associated with said top half (32); a fluid outlet (38) associated with said bottom half (34); means designed for effectively removing aluminum particles from machine coolant including a sheet-like filter media (10) supported across said filter chamber (26) between said top half (32) and said bottom half (34) in fluid sealing engagement; said filter media (10) including a top layer (12), a middle layer (14), and a bottom layer (16); said apparatus characterized by said middle layer (14) including a support web (18) formed by entangled cellulose fibers (20) having a first predetermined range of thicknesses, and a mesh (22) supported by and interspersed throughout said cellulose web (20) and being formed by entangled glass microfibers (24) having a second predetermined range of thicknesses, the mean value of said second predetermined range of thicknesses being not greater than one-fifth the mean value of said first predetermined range of thicknesses.

19. An apparatus as set forth in claim 18 further characterized by said cellulose fibers (20) including cotton fibers.

20. An apparatus as set forth in claim 19 further characterized by including a pin extractor (30) in engagement with said filter media (10) and disposed adjacent said filter chamber (26) for moving said filter media from between said top half (32) and bottom half (34).

* * * * *